United States Patent [19]

Smiley

[11] Patent Number: 4,889,078
[45] Date of Patent: Dec. 26, 1989

[54] HOG FEEDER

[76] Inventor: Gordon D. Smiley, Rte. 4, Box 245, Greensburg, Ind. 47240

[21] Appl. No.: 838,663

[22] Filed: Mar. 12, 1986

[51] Int. Cl.$^4$ .............................................. A01E 5/00
[52] U.S. Cl. .................................. 119/53.5; 119/51.5; 119/52.1
[58] Field of Search .................. 119/53.5, 51.5, 52 A, 119/53, 54

[56] References Cited

U.S. PATENT DOCUMENTS

| | | |
|---|---|---|
| 655,477 | 8/1900 | Combs .............................. 119/52 A |
| 980,496 | 1/1911 | Crockford . |
| 1,025,225 | 5/1912 | Wilson . |
| 1,096,703 | 5/1914 | Fleury . |
| 1,194,053 | 8/1916 | Meyer . |
| 1,292,693 | 1/1919 | Brackenbury ..................... 119/53.5 |
| 1,350,523 | 8/1920 | Royer . |
| 1,392,004 | 9/1921 | Fouts ................................ 119/52 A |
| 1,695,597 | 12/1928 | Lydon . |
| 1,879,247 | 9/1932 | Holliday . |
| 2,153,455 | 4/1939 | Casper et al. . |
| 2,273,616 | 2/1942 | Beatty ............................... 119/53.5 |
| 2,500,270 | 3/1950 | Boland . |
| 2,527,324 | 10/1950 | Muehlfeld ........................ 119/51.5 |
| 2,533,538 | 12/1950 | Uhrenholdt . |
| 2,644,425 | 7/1953 | Hazen . |
| 2,933,064 | 4/1960 | Geerlings . |
| 3,951,107 | 4/1976 | Doty . |
| 4,182,273 | 1/1980 | Petersen ........................... 119/51.5 |
| 4,337,130 | 3/1983 | Schwieger . |
| 4,353,329 | 10/1982 | Thibault ........................... 119/54 X |
| 4,355,598 | 10/1982 | Saylor . |
| 4,385,591 | 5/1983 | Petersen ........................... 119/53.5 |
| 4,401,057 | 8/1983 | Van Gilst . |
| 4,416,220 | 11/1983 | Dougan . |
| 4,444,151 | 4/1984 | Bohlmann . |
| 4,462,338 | 7/1984 | Thibault . |
| 4,582,023 | 4/1956 | Zumbahlen et al. ............. 119/53.5 |
| 4,640,229 | 2/1987 | Swartzendruber et al. ... 119/51.5 X |

FOREIGN PATENT DOCUMENTS

| | | |
|---|---|---|
| 1127136 | 9/1962 | Fed. Rep. of Germany . |
| 1170438 | 1/1959 | France . |
| 287789 | 4/1953 | Switzerland . |
| 202191 | 2/1923 | United Kingdom . |
| 737101 | 8/1955 | United Kingdom . |
| 1175727 | 12/1969 | United Kingdom . |

Primary Examiner—Carl D. Friedman
Assistant Examiner—Creighton Smith
Attorney, Agent, or Firm—Wood, Herron & Evans

[57] ABSTRACT

A hog feeder is disclosed including an annular trough having an upstanding center member with a horizontal top surface. A vertical post extends upwardly and rotatably supports a tapered hopper having a discharge opening located above the plateau. A plurality of radial arms carried by a polygonal plate rotate between the plateau and hopper, the arms including outer ends engageable by hogs' snouts. A removable link interconnects these arms to the hopper. The hopper is vertically adjustable to control the feed rate. A watering system is also disclosed.

25 Claims, 4 Drawing Sheets

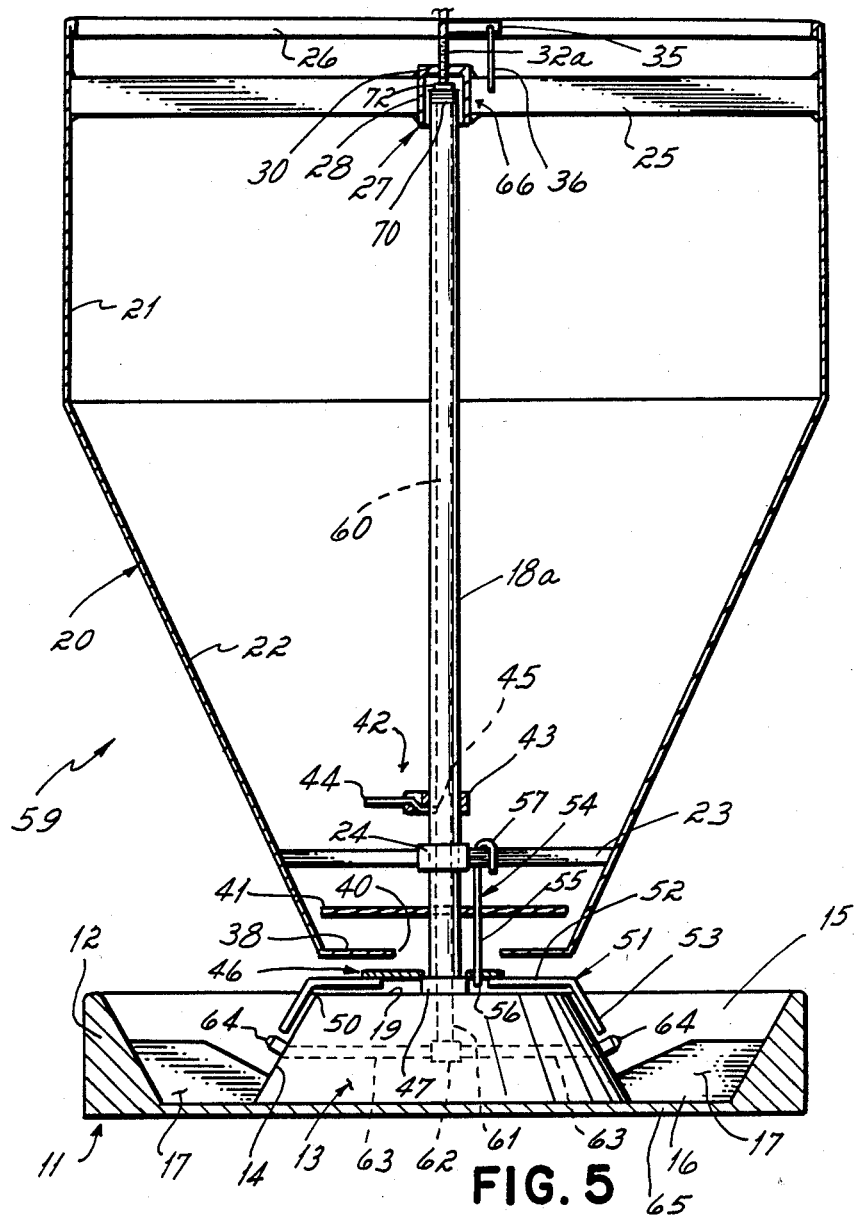
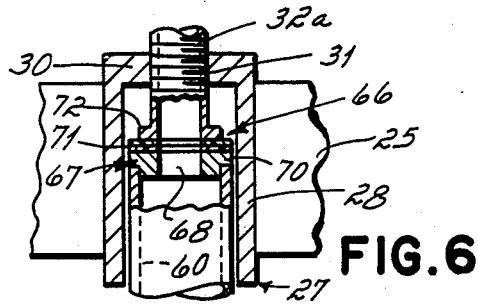
FIG. 5
FIG. 6

HOG FEEDER

BACKGROUND OF THE INVENTION

This invention relates to animal feeders and is particularly directed to a feeder for hogs in which the flow of feed into a trough is under control of the hogs.

In the past many different forms of hog feeders have been proposed including some having a stationary hopper from which feed is disposed into a trough and others including a rotary hopper which is moved by the pigs' snouts so that the flow of feed can be controlled by the animals at the feeder. Among typical prior art patents disclosing hog feeder are Thibault U.S. Pat. Nos. 4,353,329 and 4,462,338. Each of these patents discloses feeders employing stationary hoppers. In the feeder shown in U.S. Pat. No.353,329, feed drops from the central portion of the hopper and is pushed outwardly by spoke-like arms which are rotated by the hogs. In this patent the feed rate is adjusted by regulating the size of the openings in the bottom of the hopper. In the second Thibault patent, the feed rate is adjusted by raising or lowering a conical member.

Other patents disclose rotary hoppers. For example, Brackenbury U.S. Pat. No. 1,292,693 discloses a hog feeder including a rotary hopper and radial arms. Hogs push against these radial arms to turn the hopper. Another patent of this type is Royer Pat. No. 1,350,523. In this patent, the livestock push against the hopper causing it to rotate. In both the Royer and the Brackenbury patents, feed is distributed outwardly to a peripheral trough by means of an inverted cone. Fouts U.S. Pat. No. 1,392,004 and Boland U.S. Pat. No. 2,500,270 each disclose a hog feeder including a rotary hopper. This hopper can be raised and lowered to control the rate of feed discharged. Another version of a feeder including a rotary hopper is Casper U.S. Pat. No. 2,153,455. The feeder shown in this patent includes a plurality of spokes which cause the feed discharged from the hopper to be spread outwardly toward a peripheral rim.

Each of the feeders disclosed in these patents as well as the feeders actually in use at the present time are subject to one or more defects such as undue complexity, excessive maintenance costs, inefficiency of feeding, limitations as to the type of feed which can be dispensed, difficulty in operation by the hogs making the feeder unsuitable for small pigs, and the like.

SUMMARY OF THE PRESENT INVENTION

The present invention is directed to a novel hog feeder which operates in a new manner and combines in a single unit a large number of advantages which overcome defects of previous feeders. More particularly, the present hog feeder can be utilized to dispense any type of feed including meal, grain, pelletized feed, and corn. The present feeder is easy to operate and can be utilized by any animals ranging from a small pig to a full-grown hog. Moreover, the present feeder is economical to produce, durable in operation, and requires minimum maintenance.

A still further advantage of the present feeder is that it is highly efficient as a feeding device. Based upon tests of the operation of the present feeder, it is predicted that it will save approximately eighteen pounds of feed during the period in which a pig gains two hundred pounds compared to the amount of feed consumed using a competitive feeder. Thus, the use of a single feeder of the present invention represents a feed savings of approximately two hundred forty dollars per year.

A still further advantage of the present feeder is that it provides for precise control of the rate of feeding and permits this rate to be accurately established for any different type of feed.

Yet another advantage of the present invention is that it eliminates the use of stationary external hopper support members or guards. These guards have been employed in the past in an effort to prevent pigs from walking in the feed trough and otherwise wasting excessive amounts of feed. Such guards are very susceptible to excessive breakage and have resulted in injury to animals. In accordance with the present invention, these guards are eliminated and the configuration and relative dimensions of the hopper and trough are effective to prevent hogs from walking in the trough.

A still further advantage of the present hog feeder is that it is compact and is effective to handle an increased capacity of feed for a given amount of floor space.

A still further aspect of the present invention involves the provision of watering means built into the feeder, thereby eliminating the need for separate watering means in the feeding pen. The present watering means dispense water to selected areas of the feed trough through nipples or the like disposed in the trough. All of the watering lines to the nipples are located within the confines of the hopper and a center member of the base so that they are fully protected from damage by the hogs.

More particularly, the present invention is predicated upon the concept of providing a hog feeder including a base having an annular trough defined by a peripheral wall and upstanding central member which has a horizontal top surface forming a plateau. A vertical post extends upwardly from the plateau and rotatably supports a hopper including a cylindrical upper portion and a tapered lower portion. The lower wall of the hopper includes a discharge opening located above and spaced from the plateau. A plurality of radial arms carried by a polygonal plate are disposed between the plateau and hopper. These arms are rotatably mounted and include outer portions located in the trough where they can be engaged and turned by the hogs' snouts. A link interconnects these arms to the hopper so that when the arms are rotated, the hopper turns in unison with them.

In operation, feed is discharged from the hopper opening onto the plateau and is swept outwardly across the plateau and into the feed trough which is preferably divided into a series of individual feed sectors. In accordance with the present invention, the feed rate is regulated by raising and lowering the hopper. The combination of the circular opening in the hopper and the polygonal plate facilitates precise adjustment of feed rate for any type of feed which may be used including pelletized feed, meal, grain, corn, or the like.

One advantage of this construction is that the hopper is easily rotated and hence can be turned by small pigs as well as full-grown hogs. Moreover, the hog can cause more feed to be distributed by rotating the arms and hopper without disturbing the hogs which are feeding simultaneously.

In accordance with the present invention, the cylindrical portion of the hopper is at least substantially as large as and preferably larger than the trough. The tapered wall of the hopper is preferably oriented from 55°–65° to vertical so that it substantially conforms to the angle of a hog's neck when his head is inserted in the trough. This construction permits the hog to eat in a comfortable position but makes it impossible for a hog to walk around inside the trough and thereby waste an excessive amount of feed.

In a preferred embodiment of the present feeder, the hopper is interconnected to the arms by means of a removable link. When this link is disconnected, the hogs rotate the arms to push feed from the plateau into the trough. However, the hopper remains stationary. This mode of operation is completely satisfactory for certain types of feed and minimizes the amount of effort required to obtain the feed.

A modification of the present feeder also includes means for supplying water to the hogs. These means include a water line connecting to a conduit running downwardly through the post and interconnecting with one or more transverse water tubes located within the upstanding center member below the plateau. These horizontal tubes preferably carry conventional nipples at their outer ends located above one or more feed sectors of the feed trough. This construction is highly advantageous since it permits hogs to obtain both water and feed at the same station. Moreover, it permits simultaneous feeding of wet food to one or more hogs and dry food to other hogs.

These and other objects and advantages of the present invention will be more readily apparent from further consideration of the following detailed description of the drawings illustrating a preferred embodiment of the invention.

BRIEF DESCRIPTION OF THE DRAWINGS

FIG. 5 is a vertical cross-sectional view similar to FIG. 2 taken through a modified form of feeder incorporating centering means.

FIG. 6 is an enlarged view partially in section of the inlet fluid connection of the device shown in FIG. 5.

DETAILED DESCRIPTION OF THE DRAWINGS

Figure 1:
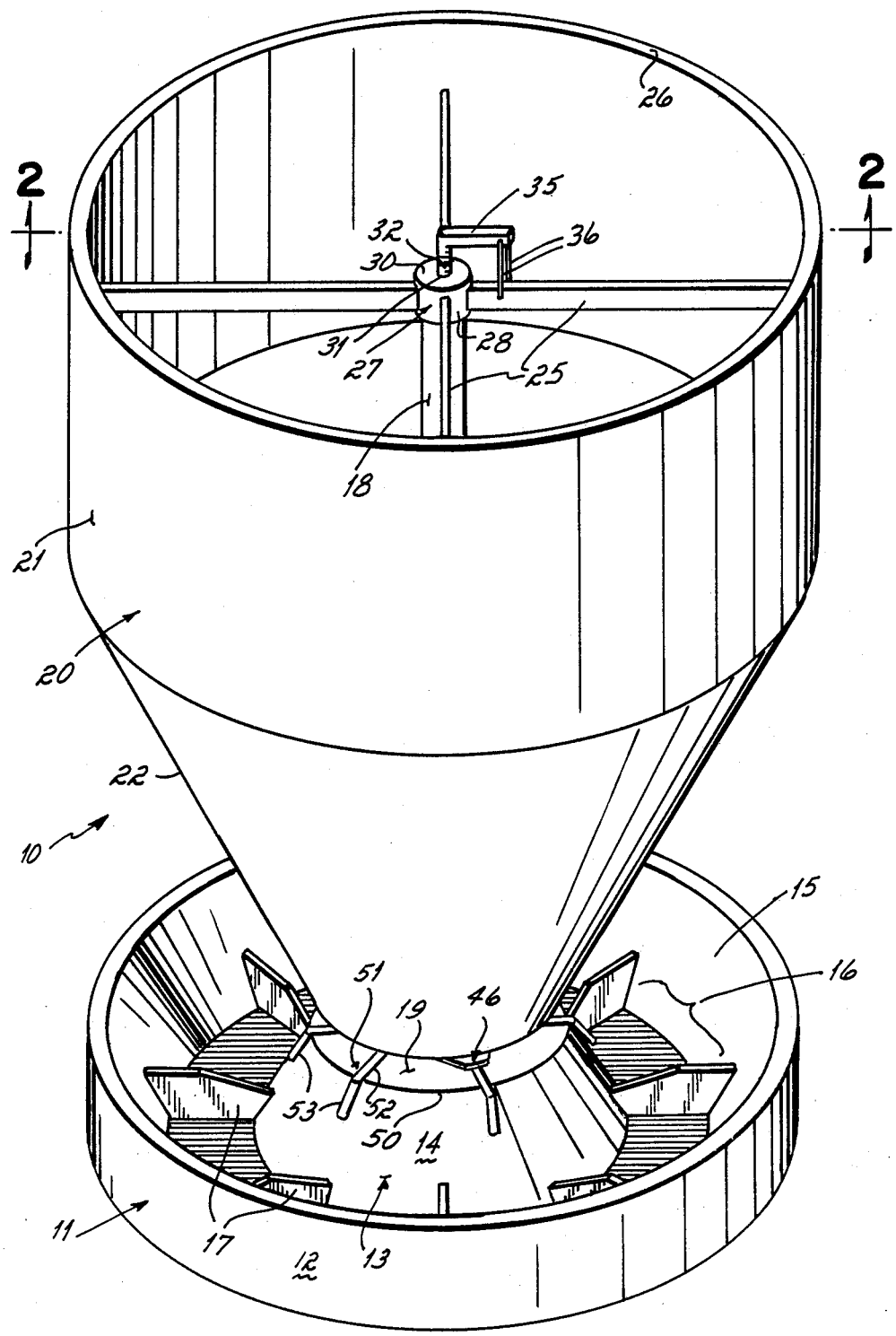
FIG. 1 is a perspective view of a preferred form of hog feeder embodying the principles of the present invention.

A preferred form of hog feeder 10 is illustrated in FIGS. 1-4. As there shown, the feeder includes a base member 11 of generally circular configuration. The base member is provided with an upstanding peripheral wall 12 and an upstanding central frustro conical member 13. Member 13 includes a sloping wall 14 and a horizontal circular top wall 19 forming a feed receiving plateau. The spacing between conical member 13 and outer peripheral wall 12 defines a feed trough 15. This feed trough is divided into a plurality of individual pie-shaped feed sectors 16 extending outwardly from sloping wall 14 to inner wall 12. As shown in FIG. 1, these individual feed sectors 16 are formed by spaced radial divider walls 17, preferably of a height substantially less than the height of plateau 19. These walls extend outwardly from sloping wall 14 to outer wall 12 and are welded or otherwise secured to the base member 11.

It is contemplated that if desired the base member and feed trough can be cast or otherwise formed as an unitary member with cast radial divider walls replacing the divider walls 17 illustrated in FIG. 1. It is also contemplated that while the preferred embodiment includes eight trough sectors, a larger or fewer number of sectors can be provided if desired.

A stationary post 18 extends upwardly from the center of the base. The post is welded or otherwise rigidly secured to base member 11. The post rotatably supports a generally cylindrical hopper 20. The hopper includes a cylindrical upper wall section 21 and a downwardly tapered lower wall section 22. The outer diameter of upper section 21 is preferably at least substantially as large or larger than the diameter of base member 11. Lower wall section tapers inwardly at an angle of approximately 55°-65° from vertical so that t substantially conforms to the angle of a pigs neck as he eats from the trough. The tapered wall is thereby effective to prevent a pig from stepping in the trough or otherwise excessively scattering food from the trough.

The lower wall section 22 carries a plurality of radially inwardly extending struts 23 which are secured to the wall 22 in any suitable manner such as by welding. The inner ends of these struts 23 are secured to an annular bearing member 24 which surrounds and rotatably engages post 18.

The upper wall 21 similarly carries a set of upper struts 25 which are secured to the inner surface of upper wall 21 a slight distance below the upper rim 26 of that member. Upper struts 25 are secured at their inner ends to an inverted cup member 27. Cup 27 includes a cylindrical outer wall 28 which surrounds post 18 and a top wall 30. Top wall 30 is provided with a threaded central opening 31 which receives an adjustable abutment screw 32. The lower end of screw 32 carries a bearing plate 33 which abuts the upper end 34 of post 18. The upper portion of adjusting screw 32 carries a radially extending lever arm 35 by means by which screw 32 may be rotated. Lever arm 32 carries a pivoted locking member including two spaced depending arms 36 which embrace one of the upper struts 25. These pins insure that adjusting screw 32 is rotated with hopper 20 when the hopper is rotated during use.

Figure 2:
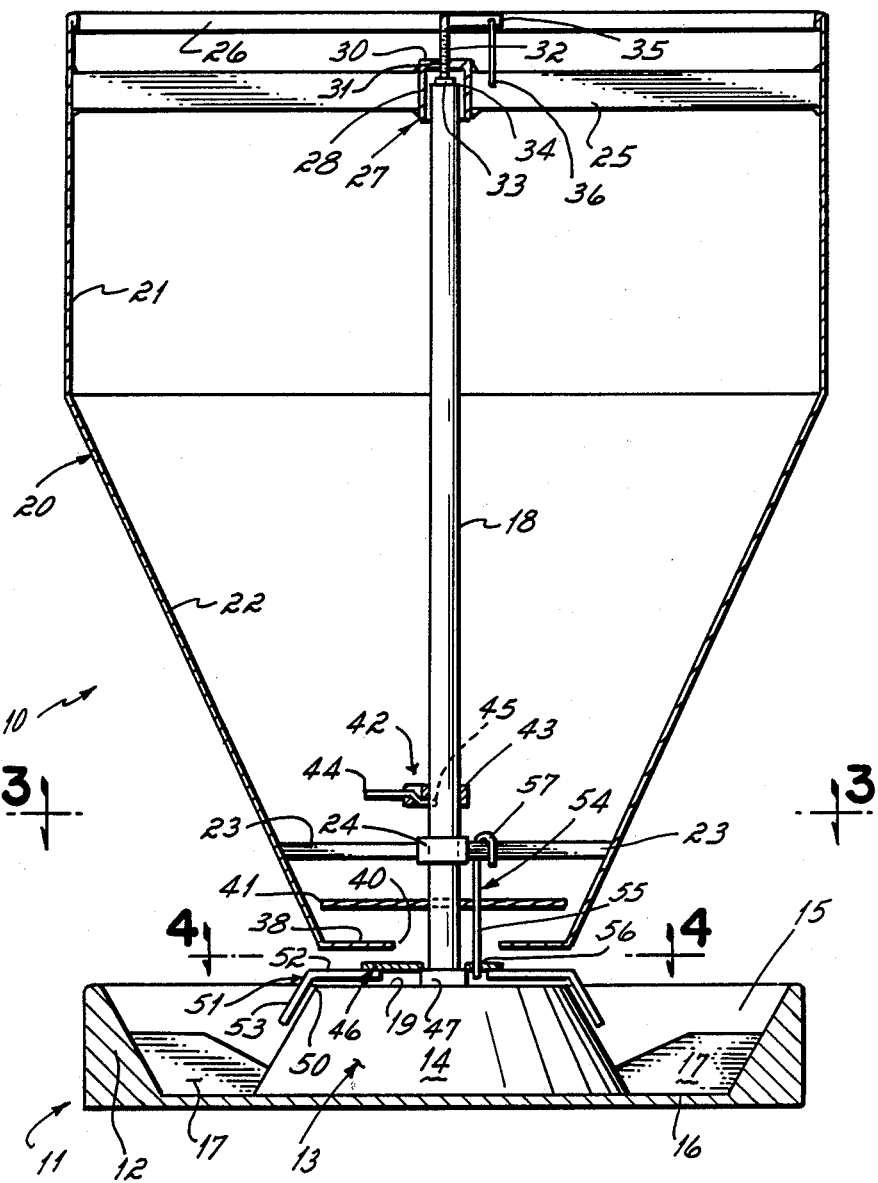
FIG. 2 is a vertical cross-sectional view of the feeder taken along line 2—2 of FIG. 1.
Figure 3:
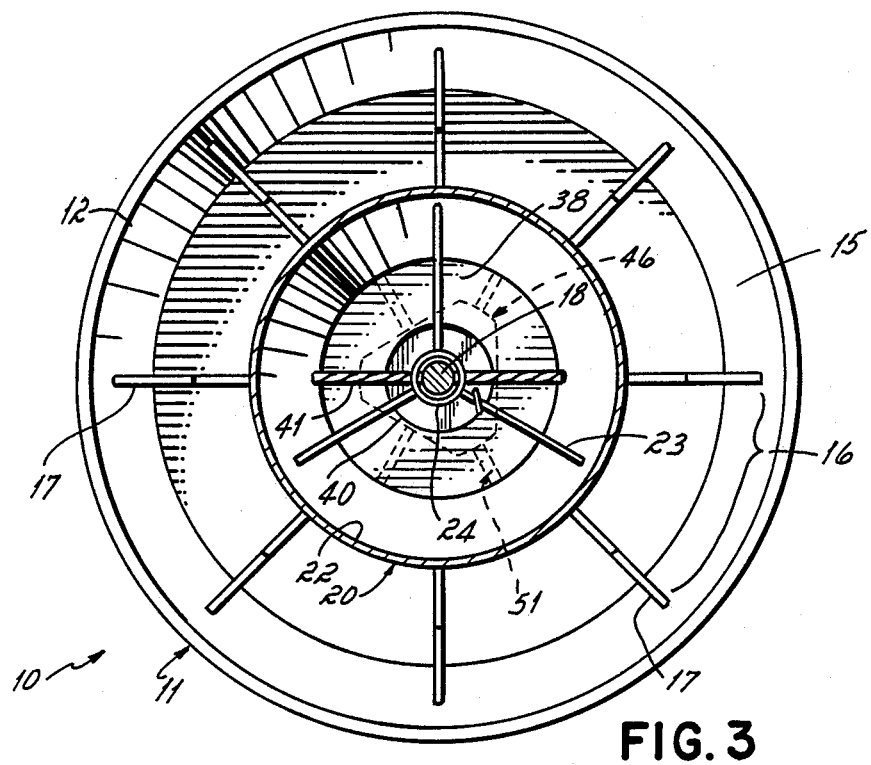
FIG. 3 is a cross-sectional view taken along line 3—3 of FIG. 2.

As is best shown in FIG. 2, hopper 20 also includes an inwardly extending annular bottom wall 38. The outer diameter of this wall is preferably substantially the same as the outer diameter of plateau wall 19. The bottom hopper wall 38 has a central opening 40 which receives post 18. The diameter of opening 40 is substantially larger than the diameter of the post. Bottom wall 38 preferably extends in a horizontal plane parallel to and spaced from plateau 19. The height of the hopper 20 and hence the spacing of walls 38 and 19 is adjusted by pivoting lock arms 36 upwardly to disengage them from upper strut 25 and rotating adjusting screw 32. Changing the height of the hopper regulates the amount of feed which is discharged from the hopper.

As further shown in FIG. 2, post 18 carries a radially extending flexible wire 41. This wire extends through diametrical opening in post 18 and extends outwardly toward the sloping wall 22 of the hopper but terminates a slight distance from that wall. Wire 41 functions to break up feed within hopper as the hopper is rotated. Post 18 also carries a hopper locking member 42. The locking member 42 includes an annular sleeve 43 which fits over post 18 and carries a lever 44. The lever includes an end which is adapted to the inserted in opening 45 in the post. This end can be removed by pivoting lever 44 upwardly within a recess in sleeve 43. When the end of lever 44 is inserted in recess 45, sleeve 43 is locked in position and the hopper can not be raised upwardly to remove it from post 18. If it is desired to remove the hopper, lever 44 is disengaged from opening 45 so that sleeve 43 is free to pass upwardly and does not restrain upward movement of the hopper.

Figure 4:
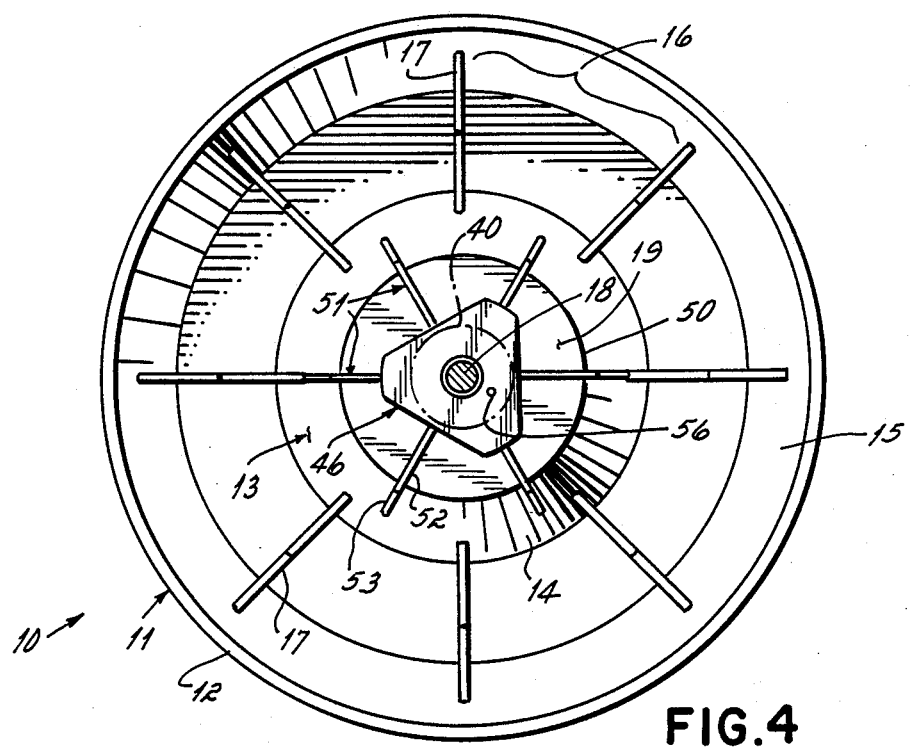
FIG. 4 is a cross-sectional view taken along line 4—4 of FIG. 2.

In addition to the elements above described, the hog feeder further comprises a distributor plate 46 which is preferably of generally triangular or other polygonal configuration. Distributor plate 46 is mounted upon a bushing 47 which rotatably engages post 18. In the preferred embodiment bushing 47 floats, i.e. is free to move vertically along post 18. Distributor plate 46 is preferably dimensioned so that it is slightly larger in a transverse dimension than the diameter of hopper opening 40 (see FIG. 4). Plate 46 overlies plateau 19 and its periphery is spaced inwardly from the periphery 50 of the plateau. Plate 46 carries a plurality of outwardly extending arms 51 as shown in FIG. 4. These arms extend generally radially outwardly from center of post 18 and are substantially equally spaced. Each of the arms 51 include a horizontal section 52 which extends parallel to plateau wall 19 and is spaced slightly from that wall. Each of the arms 51 also includes a downwardly depending section 53 joined to the end of horizontal section 52. Each of the depending sections 53 extends parallel to sloping wall 14 of conical member 13. Depending arm portions 53 are disposed in the upper portion of feed trough 15. Thus, a pig feeding in the trough can push his snout against one of the arm sections 53 and thereby cause the arms and plate 46 to rotate around post 18.

The relationship of plateau 19 and arms 51 to the feed trough 15, base member 11, and hopper 20 are best shown in FIG. 2. As there shown, the plateau is elevated a substantial distance above the bottom wall of base member 11 and located at substantially the same height as the peripheral wall 12 and trough 15. The height of this plateau from the bottom wall of the base member is greater than the distance between the plateau and bottom hopper wall 38.

Arms 51 extend across the top of the plateau and terminate in depending portions 53 which extend downwardly along the outer sloping wall 14 of the central frustro conical member 13. The lowermost ends of arm sections 53 are disposed above divider walls 17. These arms extend radially outwardly across only a very small fraction of the width of trough 15.

Rotary motion of plate 46 is transmitted to hopper 20 by means of connecting link 54. This link has a vertical section 55 the end of which extends through an opening 56 in plate 46. The upper end of link 55 includes a hook section 57 which is bent over one of the struts 23. Thus, as plate 46 is rotated, the rotary movement of that member is transmitted through link 54 to strut 23 and through that strut to hopper member 20. It is to be understood that wire 41 is sufficiently flexible that it does not offer any appreciable resistance to the rotation of the hopper. If it is desired to operate the feeder with the hopper stationary, it is only necessary to remove link 54. With this link removed, arms 51 and plate 46 rotate but this rotary motion is not transmitted to hopper 20 which remains stationary.

In operation, the height of the hopper 20 is adjusted to provide the desired spacing between bottom wall 38 of the hopper and plateau wall 19. This adjustment is accomplished by rotating adjusting screw 32. After the desired adjustment has been made, the rotating screw is locked to the hopper by pivoting arms 36 downwardly so that they engage strut 25 as shown in FIGS. 1 and 2. It is to be understood that this adjustment provides means for regulating the rate of feed flow from the hopper and the amount of force required to turn the hopper. Also, depending upon whether it is desired to have hopper 20 rotate or remain stationary, link 54 is inserted or removed from the opening on plate 46. After the desired adjustments have been made, the hopper is filled with suitable hog feed which may be in the form of pellets, corn, or the like.

Initially, the feed drops through opening 38 onto plateau 19. When one or more hogs come to the trough, they push arm portions 53 with their snouts. This causes rotation of the arms and plate 46 and assuming link 54 is in place, also causes rotation of hopper 20 through the interconnection provided by link 54.

As arms 51 rotate, they sweep across plateau 14 and push the feed which has dropped onto that plateau radially outwardly so that it drops into the sectors 16 in the feed trough. It will be appreciated that in the embodiment shown, eight hogs of any size from small weaned pigs of perhaps 40 pounds to full-sized hogs can be fed, each hog having its own individual feed sector. Moreover, if one hog turns arms 51, it does not disturb the remaining hogs.

A modified form of hog feeder is shown in FIGS. 5 and 6. The hog feeder 59, there shown, incorporates the same basic elements as the hog feeder shown in FIGS. 1–4, i.e. a base member 11, a hopper 20, a center post 18a, arms 51, plate 46, and a link 54 selectively interconnecting the arms and hopper. In the description of FIGS. 5 and 6, those parts which are identical to the corresponding parts of the preferred embodiment are given the same number. (These parts which are modified are identified by the number previously employed followed by the letter "a".)

The modified embodiment shown in FIGS. 5 and 6 differs from the embodiment shown in FIGS. 1–4 in that it includes means for providing water to one or more sectors of the trough. These watering means include a conduit 60 formed within hollow vertical post 18a. This conduit interconnects with a tube 61 extending downwardly from post 18a within the interior of upstanding center member 13. Tube 61 is connected to a "T" member 62 which supports two horizontal tube sections 63. These tube sections extend outwardly through openings provided in sloping wall 14 of member 13 and carry nipples 64 at their outer end. These nipples may be of any form suitable for watering hogs. Their construction is well-known in the art and constitutes no part of the invention.

In the modified feeder 59, either the peripheral wall 12 or the bottom wall 65 of the trough is provided with one or more drain openings (not shown) in the sections 16 fitted with nipples 64. This enables those sections to which water is supplied to be drained without the water overflowing into adjacent sections.

The upper end of post 18a is provided with a fluid inlet connection 66 for connecting the interior of post 18a to a water line. As shown in FIGS. 5 and 6, this fluid connection includes an annular plug 67 which is brazed or otherwise secured to the end of post 18a. Plug 67 includes a central bore 68 and a horizontal shoulder 70. Shoulder 70 supports one or more washer members 71 formed of a suitable plastic material such as teflon.

The upper end of post 18a is surrounded by an inverted cup member 27 carried by strut 25 in the same manner of the preferred embodiment. Cup member 27 includes a top wall having a threaded opening which receives an adjusting screw 32a. Adjusting screw 32a is provided with a central bore which is connected through any suitable coupling to a water inlet line. The interconnection between the water inlet line and adjusting screw 32a is just that screw 32a is free to rotate. This screw includes a lower flange 72 which abuts washers 71. These washers providing a generally fluid type connection enabling water to flow through adjusting screw 32a and post 18a to tube 61, "T" 62, and tubes 63 to nipple 64. It is to be understood that adjusting screw 32a carries a lever arm 35 and locking member 36 which function in the same manner as the corresponding elements of the preferred embodiment.

In operation, the modified feeder shown in FIG. 5 operates to dispense feed in the same manner as the feeder of FIG. 1. In addition, however, water can be provided to one or more feed sections 16 through nipples 64. This arrangement enables hogs desiring water or wet food to be satisfied while other hogs are simultaneously eating dry food. Since all of the water lines are located inside the feeder unit they are protected from inadvertent damage by the hogs.

From the following disclosure of the general principles of the present invention and the above description of preferred embodiments those skilled in the art will readily comprehend various modifications to which the invention is suitable. Thus, for example, it is contemplated that the sides of plate 46 instead of being straight lines can be concave. Therefore, I desire to be limited only by the scope of the following claims:

What is claimed:

1. A hog feeder comprising:
   an annular trough member including an upstanding outer peripheral wall and an inner wall;
   an upstanding central member having a top surface defining a plateau, and an upstanding wall defining said inner wall of said annular trough;
   a vertical post extending upwardly from said central member;
   a hopper mounted upon said post and having a bottom edge disposed above and spaced from said top surface,
   said hopper having a bottom opening therein;
   the spacing between said hopper and said top surface controlling the rate of discharge of feed from said hopper;
   a plurality of radially extending arms disposed intermediate said bottom opening and said top surface, and mounted for rotation about said post;
   said arms comprising a horizontal portion and an endwise portion disposed in said trough member;
   said endwise portion being exposed for engagement by a hog for imparting rotary motion to said arms;
   said endwise portion extending radially across only a small fraction of the width of said trough whereby a hog can continue to feed from said trough without being struck by said arms when said arms are rotating;
   said arms being effective to cause feed discharged from said hopper opening to be shifted outwardly over said top surface and to drop unimpeded from said top surface into said trough.

2. The feeder of claim 1 further comprising a horizontal plate disposed intermediate said hopper and said top surface and supporting the inner ends of said arms, said plate having a transverse dimension less than a transverse dimension of said top surface, whereby feed drops from said plate onto said top surface and is urged outwardly by said arms.

3. The feeder of claim 2 in which said plate is polygonal.

4. The feeder of claim 1 further comprising adjusting means for raising and lowering said hopper relative to said plateau surface.

5. The feeder of claim 1 further comprising means for mounting said hopper for rotation about said post and means interconnecting said hopper and said arms.

6. The feeder of claim 5 in which said last named means is removable whereby said hopper can be selectively rotated with said arms or maintained in a stationary position.

7. The feeder of claim 4 in which the adjusting means comprises a plurality of struts secured to the inner wall of said hopper, a member secured to said struts and having a threaded opening and a threaded abutment member engaging said threaded opening and abutting said post.

8. The feeder of claim 1 in which said hopper includes a cylindrical upper portion and a tapered lower portion.

9. The feeder of claim 8 in which the diameter of said cylindrical upper portion is at least substantially as large as the diameter of said trough.

10. The feeder of claim 9 in which said tapered section tapers at an angle of about 55°–65° to vertical.

11. The feeder of claim 1 in which said trough is divided into a plurality of individual feeding sectors and said vertical post is hollow and includes connection means at its upper end for connecting it to a water line, and horizontal conduit means disposed beneath said vertical post and communicating with the interior thereof, said horizontal conduit means extending outwardly through said upstanding wall and carrying a plurality of nipples within the feeding sectors of said trough.

12. The feeder of claim 11 in which said connection means includes a threaded abutment member carried by said hopper and disposed for engagement with the upper end of said vertical post, said abutment member having a fluid conduit in communication with the interior of said vertical post.

13. The feeder of claim 7 in which said threaded abutment member carries an outwardly extending lever, and locking means associated with said lever for engaging a strut.

14. The feeder of claim 2 in which said plate is free to float vertically along said vertical post.

15. The hog feeder of claim 1 in which said plateau is disposed at substantially the same height as said upstanding peripheral wall.

16. The hog feeder of claim 1 in which said plateau is disposed at substantially the same height as the height of said trough.

17. The hog feeder of claim 1 in which said endwise portions of said arms extend downwardly from the horizontal portions thereof.

18. The hog feeder of claim 17 in which said upstanding central member includes a sloping peripheral wall and in which said endwise portions of said arms extend downwardly adjacent said peripheral wall.

19. The hog feeder of claim 1 further including a plurality of divider members extending between said central member and said peripheral wall, the endwise portions of said arms depending downwardly but terminating above said divider walls.

20. The hog feeder of claim 1 in which said plateau is disposed above the bottom of said trough a distance greater than the distance the bottom edge of said hopper is spaced from said plateau.

21. A hog feeder comprising:
a base member including an upstanding peripheral wall,
an upstanding central member having a horizontal top surface defining a plateau and a downwardly sloping outer wall, said downwardly sloping outer wall and peripheral wall defining a trough therebetween;
a plurality of dividers extending between said walls and defining sectors of said trough;
a vertical post extending upwardly from said central member;
a hopper;
means rotatably supporting said hopper from said post;
said hopper having a bottom edge disposed above and spaced from said top surface;
said hopper having a bottom opening therein surrounding said post;
the spacing between said hopper and said top surface controlling the rate of discharge of feed from said hopper;
a plurality of radially extending arms disposed intermediate said hopper bottom edge and said top surface;
a horizontal plate disposed intermediate said hopper bottom edge and said top surface and supporting the inner ends of said arms, said plate being mounted for rotation about said post;
said plate having a transverse dimension less than the transverse dimension of said top surface;
said arms having outer endwise portions disposed within said trough above said dividers, said endwise portions being exposed for engagement by a hog for imparting rotary movement to said arms, said endwise portions extending across only a small fraction of the width of said trough whereby a hog can continue to feed from said trough without being struck by said arms when said arms are rotating;
said arms being effective to cause feed discharge from said hopper opening to be shifted outwardly over said top surface and to drop unimpeded from said top surface into said trough.

22. The feeder of claim 21 in which said plate is polygonal.

23. The feeder of claim 22 further comprising adjusting means for raising and lowering said hopper relative to said plateau surface.

24. The feeder of claim 21 further comprising means for selectively interconnecting said hopper and said arms.

25. The feeder of claim 21 in which said plate is free to float vertically along said vertical post.

* * * * *